Figure 1:
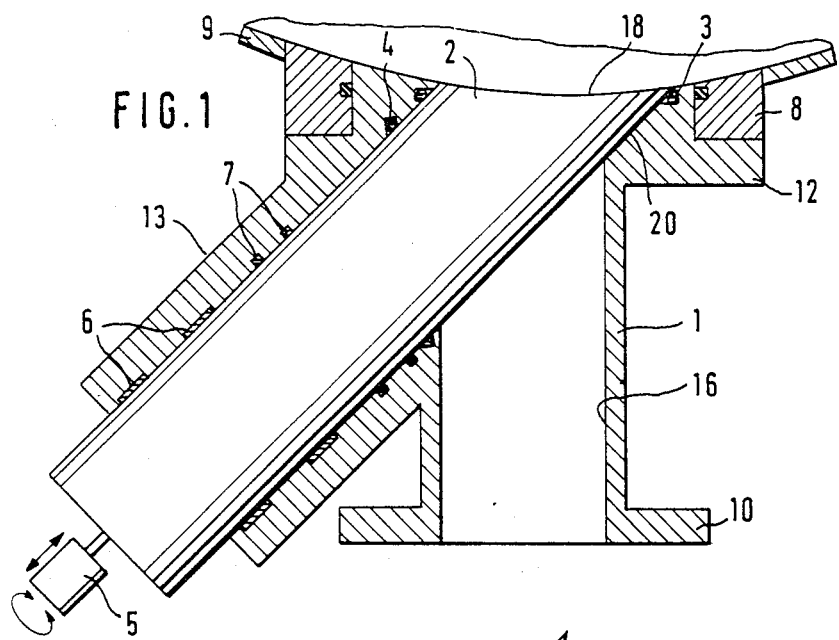

United States Patent [19]

Titus

[11] Patent Number: 4,858,641

[45] Date of Patent: Aug. 22, 1989

[54] SHUT-OFF VALVE

[76] Inventor: Hans-Joachim Titus, Le Donatello, 13, Av. de Papalines, M.C. 98000, Monaco, Monaco

[21] Appl. No.: 197,117

[22] Filed: May 20, 1988

[30] Foreign Application Priority Data

May 22, 1987 [DE] Fed. Rep. of Germany ....... 3717239

[51] Int. Cl.⁴ ............................................ F16K 13/00
[52] U.S. Cl. .................................. 137/244; 251/144; 251/229
[58] Field of Search ............... 251/144, 215, 224, 304; 137/244

[56] References Cited

U.S. PATENT DOCUMENTS

| | | | |
|---|---|---|---|
| 3,658,083 | 4/1972 | Futterolf et al. | 137/244 |
| 4,506,704 | 3/1985 | Boom et al. | 137/883 |
| 4,535,969 | 8/1985 | Riley | 251/215 |

FOREIGN PATENT DOCUMENTS

| | | | |
|---|---|---|---|
| 1450469 | 12/1968 | Fed. Rep. of Germany | 251/215 |
| 806485 | 12/1958 | United Kingdom | 251/144 |
| 2125942 | 3/1984 | United Kingdom | 137/872 |

Primary Examiner—John Fox
Attorney, Agent, or Firm—Christel, Bean & Linihan

[57] ABSTRACT

A shut-off valve for liquids and other substances to be attached to the outlet flange of a container, with a cylindrical valve body (2) which extends through the valve housing inclined at an acute angle to the vertical and whose cylindrical guide (14) ends in an upper elliptical opening of the inlet flange (12), with the face (18) of the valve body also exhibiting an elliptical circumference adjusted thereto. Connected to the lower side of guide (14) is a generally vertical cylindrical downpipe (16), and the valve body (2) is turned from its closed position blocking the valve passage by 180° via actuating means and then shifted axially until completely open. During the closing process, which involves the above process in reverse, the circumferential edge of the valve body shaves all material off the sealing ring (3) and the sealing surface (20) prior to reaching the closed position.

4 Claims, 3 Drawing Sheets

SHUT-OFF VALVE

The invention relates to a shut-off valve with a housing passage between two end flanges, a cylindrical guide ending in the housing passage at a vertical angle into which a twistable, cylindrical valve body is routed in a sealed state by means of a seal running in an elliptical manner, a face of the valve body exhibiting a generally elliptical contour and with actuating means which twist the valve body by 180° to close the housing passage.

In a shut-off valve of the kind mentioned above known from DE-GM No. 82 19 177, the guide ending in the housing passage contains a twistable valve body with a cylindrical jacket surface whose face forms an inclined choke surface having an elliptical contour, so that this design enables an exact and continuous setting of the valve flow with only a half turn of the valve body, with both the completely closed state as well as the completely open static being achieved.

Known on the other hand from U.S. Pat. No. 3,658,083 is a shut-off valve which is employed as a discharge valve or floor tap of containers and devices in which are contained liquids or other flowable or pourable substances. In this known bottom valve, a cylindrical valve body with which an internal spindle may be adjusted is provided in a vertical guide ending in the bottom of the container. As it lowers, the upper edge of the valve body at a certain height releases a discharge pipe connection which branches off laterally from the vertical guide and is inclined downward and whose opening is more or less closed depending on the setting of the height of the valve body. The necessarily laterally tilted progression of the discharge pipe connection delays the emptying of the container or causes obstructions when pourable substances or materials of low viscosity are involved. In addition, there exists the danger in the case of chemical devices such as crystallization containers or dryers that crusts of the product will form on the bottom of the container which are not always destroyed when a valve, slide or ball valve is opened and hence obstruct or completely clog the container outlet.

The object of the invention is therefore to improve and further develop a shut-off valve of the kind indicated in the introductory clause of the first claim which, when used as the bottom outlet of a container, keeps the bottom of the container free of depressions and similar dead spaces in which the chemical, mechanical or thermal treatment of the material in the container could be disrupted or hampered, and with which deposits or crusts that form in particular in the area of the valve inlet may be automatically eliminated during the process of both opening and closing.

This object is achieved as per the invention by the guide which ends in the housing passage extending up to the area of the flange situated at the inlet, forming an elliptical opening there and containing at least one elliptical seal near the face of the flange, by the housing passage forming a downpipe which runs generally vertical to the opening in the inlet flange, and by the actuating means being designed in such a way that it shifts the valve body to close the housing passage in a state where it is turned by 180° relative to its sealed position until the opening is half closed and half of the seal is covered, with a 180° turn ensuing only thereafter.

Since any dead spaces above the valve body closing off the passage are prevented in the proposed design, no bottom sump—i.e., no area not included in the overlying crystallization, drying, mixing and/or granulation process—can come about in the container. These features are of crucial importance above all in the area of pharmaceutical products, when any kind of contamination of the product with its own mother liquor is prevented as well for the manufacture of sterile injection ware free of foreign particles. One example along these lines is when end products which are naturally white become dyed yellow, which may essentially be attributed to the existence of dead spaces in the shut-off elements.

Another important aspect of the shut-off valve as per the invention relates to the combined rotational and axial movement of the cylindrical valve body guided longitudinally to the axis of the valve body at an angle, as the height of the valve housing between the inlet flange and outlet flange can be kept as low as possible as a result of this concept. In connection with the specially designed inclined face, the combined rotational and axial movement of the valve body makes it possible to shave off the product adhering in the area of the inlet opening, particularly on the sealing ring, during the closing process. This aspect is particularly important for the reliable closing of the valve; this is because the sealing seat is basically dusted with powder or crystals, possibly with paste or a thick pulp from incrustations after the process of emptying in particular dry products. It is possible as per the invention to insert the valve body into the seal located near the inlet flange in such a way that the adhering product is shaved off from the circumferential edge of the sealing ring, and the cylindrical valve body is turned into the seal with the cylindrical circumference freed of adhering material only thereafter. The valve can only be sealed vacuum-tight during operation by this relative movement between the cylindrical valve body and the oval or elliptical seal.

Other features and advantages of the invention are outlined in the following description of an embodiment of a shut-off valve in connection with the drawings.

Shown diagrammatically are

Figure 2:
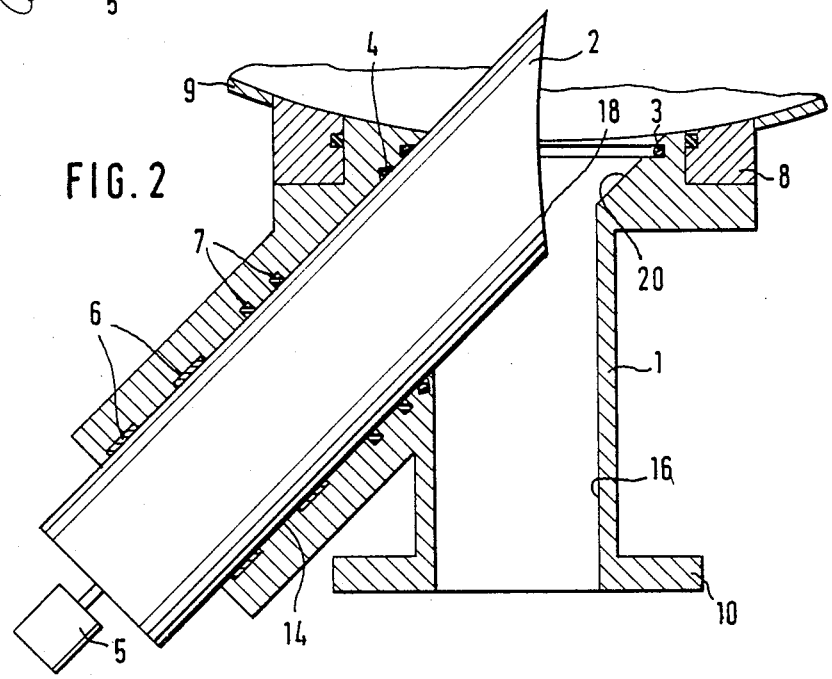
Figure 3:
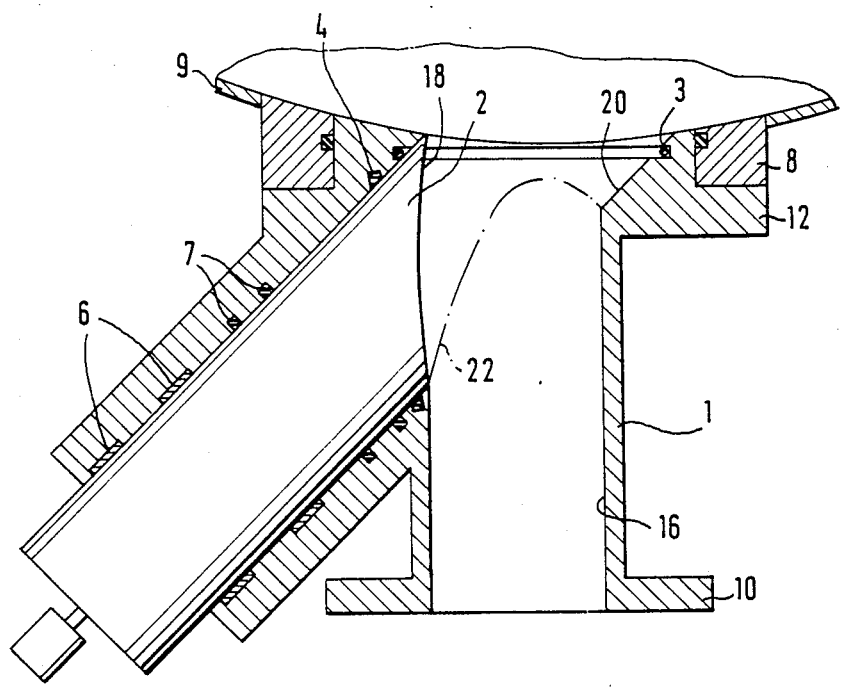
Figure 4:
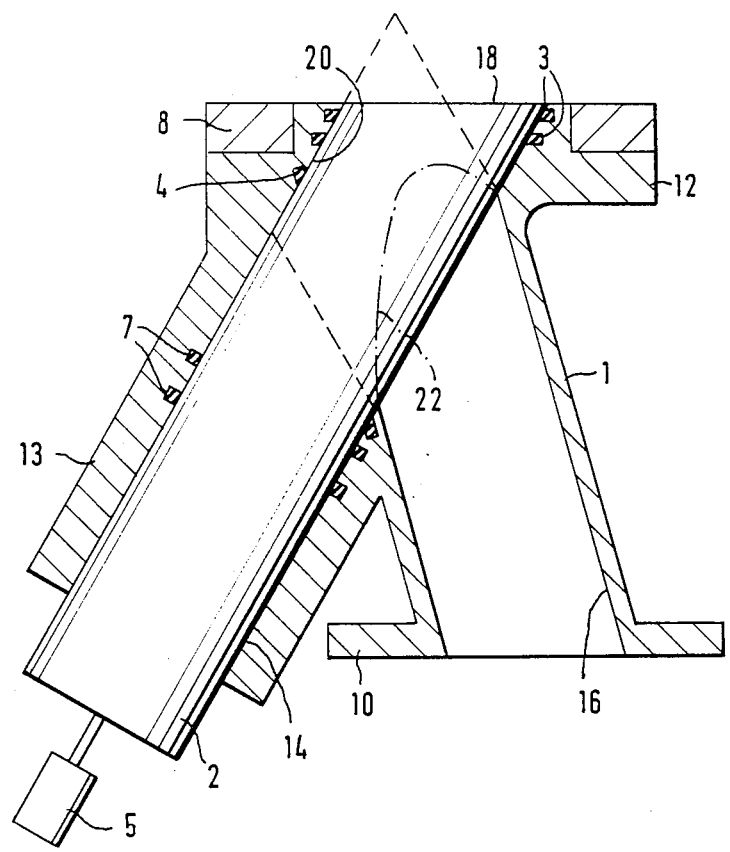

FIG. 1: a vertical section through a valve flanged to the underside of a container with the cylindrical valve body in the closed position, FIG. 2: the valve housing as shown in FIG. 1, but with a half-open valve body turned by 180°, FIG. 3: the valve housing as in FIG. 1 with completely opened valve body and FIG. 4: similar sectional view as above of a modified form of execution of a valve with a suited downpipe.

As shown graphically in the figures, a valve body 1 of a shut-off or bottom discharge valve is situated on the lower side of a curved container 9 containing a welded-in bottom flange 8 to which is screwed the shut-off valve with its inlet flange 12. A passage 16 generally forming a vertical downpipe runs between the inlet flange 12 and a flange 10 on the outlet side. The valve housing is constructed in such a way that it may easily be screwed to a standardized container flange 8 in a sealed fashion without any adjustment work or finishing operations.

Used for closing and opening the valve is a cylindrical valve body 2 which is routed into a guide channel 14 inclined toward the vertical axis of the valve housing at an angle of between 30° and 60° (here especially approx. 45°) with the help of a driving mechanism diagrammatically shown in FIG. 2 in position 5 in such a way that it can shift longitudinally and is sealed in a rotatable manner. Employed to this end are sealing elements 3, 4 and 7 as well as a support for the valve body 2 consisting of slide bearings 6 inside the guide channel 14.

As may be seen from FIG. 1, the valve body 2 has a face or frontal surface 18 adjusted to the course of the face of the inlet flange 12. In the embodiment shown, both the face of the inlet flange 12 as well as the face 18 of the valve body 12 are adapted to the bend or curve of the container bottom 9 to avoid dead spaces. This prevents any dead spaces, so that no sump on the bottom of the container can come about even in the area of the valve; the area occupied by the valve is rather completely closed on the bottom of the container, and this area is as a result included in the crystallization, drying, mixing or granulation procedure taking place inside the container.

In order to open the valve, the valve body 2 is first turned by 180° with the help of the driving mechanism as per FIG. 2, so that the face 18 which originally ran approximately horizontally proceeds in a vertical direction, breaking up any deposits which may have formed in the container while moving in this way. A process of breaking up deposits such as this is of crucial importance for an automatically progressing process of emptying the container.

In FIG. 3, the valve body is in its completely returned open position to which it was brought following the 180° turn in FIG. 2. The face 18 of the valve body 2 now forms a continuation of sorts of the vertical wall of the lower downpipe 16, which ensures product discharge free of undesired crust.

The arrangement shown, in which the motional axis of the valve body 2 forms an angle of between 30° and 60°, preferably 45° here, with the vertically running main axis of the valve housing, results in the lowest possible height of the valve body and at the same time in an elliptical opening in the cylindrical guide channel 14 in the area of the inlet flange 12 which may be used to make product discharge from the container as unobstructed as possible. Located in the elliptical opening in the inlet flange 12 of the shut-off valve near the latter is an elliptical seal 3, a similar version of which is also situated in the guide channel 14 as an elliptical seal 4. The inclined guide channel 14 extends slanted through the valve housing 1 (at an angle of about 45° to the main axis of the valve in the example) and forms the valve inlet opening on the upper side of the valve housing in the area of the inlet flange 12.

Visible from the drawings, in particular from FIG. 3, is that the upper elliptical opening of the guide channel in the inlet flange 12 is bordered on the left side at about the same location as the left side of the downpipe 16. The cylindrical diameter of the downpipe 16, which extends up to the lower side of the inclined guide hole 14, is roughly the same as the diameter of the valve body 2 in the example shown. On the right hand side of FIG. 3, the elliptical inlet opening extends to the right beyond the projection of the downpipe 16, with this arrangement having been selected for purposes of space-saving accommodation but not being compulsory. Given a steeper inclination of the guide pipe 16, the upper inlet opening could be brought into a symmetrical position relative to the vertical valve axis.

In order to close the valve from the position shown in FIG. 3, the valve body is again moved to its closed position as per FIG. 1 after the container has been emptied. The sealing surface 20 in the inlet area is dusted with powder or crystals when emptying in particular dry products. Incrustations form in this area while emptying pastes or thick pulp. Since all known valve bodies are moved on their sealing seat only with the help of axial movement, the valve can basically not be sealed sufficiently due to the product adhering to the sealing seat. In the shut-off valve as per the invention, the product adhering to the sealing ring 3 is first shaved or scraped off via the axial movement of the valve body 2 before the closed position is achieved during the closing motion, which takes place in the reverse sequence as the opening motion. The shaving process is here carried out by the edge of the valve body located around the circumference in gear with the sealing ring. After reaching the end position in which the axial movement ceases as per FIG. 2, the valve body is turned into the closed position as per FIG. 1, with the edges of the inclined face freeing the sealing ring 3 of the adhering dust and product during this turning motion as well. This relative movement between the cylindrical valve body 2 and the seal 3 makes it possible to close the valve seat vacuum-tight with the help of the valve body.

Shown on FIG. 4 is a form of execution for a valve as per the invention modified with respect to the drawings described above in which the downpipe 16 exhibits a slight inclination between the inlet flange 12 and outlet flange 10 with the application of the same principle. Taking into account the angle of repose known from the bulk material, this inclination can measure at most roughly 30° relative to the vertical, with the axis of the downpipe as per FIG. 4 being inclined at an angle of 15° to the vertical, so that smooth pouring of the bulk material to be decanted from the container is ensured in each case.

The open position and an important intermediate position of the cylindrical valve body 2 are shown with discontinuous lines in FIG. 4. In order to open it, the valve body 2 is first turned by 180° from its closed position, so that its face 18 running horizontally in the closed position assumes the inclined progression shown by the dashed lines. A crust formed on the bottom of the container is in turn broken up during this turning motion. The valve body 2 is then moved in the longitudinal direction, so that its face 18 assumes the open position shown with discontinuous lines in which it attaches to the lower wall of the downpipe 16.

The cylindrical guide and sealing surface 14 of the valve body 2, which is inclined by about 30° to the vertical in the example as per FIG. 4, extends to the face of the inlet flange 12 as an upper sealing surface 20, during which an intersection with the cylindrical downpipe 16 is provided along the edge 22 as in the example first described. As the downpipe 16 inclines as per FIG. 4, the expansion of the elliptical interface is reduced in the longitudinal axis to in this way accommodate a wider opening (i.e., a larger diameter of the valve body 2 as well as the downpipe 16) at a preset diameter of the bunker flange 8. As evident from a comparison between FIGS. 1 and 4, considerably lower exterior dimensions become necessary given the same diameter of the cylindrical valve body 2 as well as of the downpipe 16, and hence given a constant opening cross section for the throughput quantity in the form of execution as per FIG. 4. This variant has a beneficial effect on the overall dimensions in the case of smaller nominal values in particular.

Other than the double-elliptical seals 3 in the area of the sealing surface 20, there are no design changes with respect to the form of execution described first, with which there is agreement in terms of the motional sequences of the valve body.

I claim:

1. A shut-off valve for closing the lower end of a container the shut-off valve comprising:
    a valve housing having upper and lower flanges, a housing passage between upper and lower end flanges, a cylindrical guide channel intersecting the housing passage at an acute angle and terminating at the upper end of the housing passage in an elliptical opening;
    an elliptical seal in the cylindrical guide channel adjacent the upper flange;
    a rotatable cylindrical valve body concentric with the cylindrical guide channel and rotatable between a closed position and an open position, a face of the rotatable cylindrical valve body exhibiting a generally elliptical contour and capable of closing off one end of the housing passage, a portion of the body adjacent the face engaging the elliptical seal when the rotatable cylindrical valve body is disposed within its closed position; and
    actuating means for rotating the valve body between open and closed positions in such a manner that the elliptical seal is shaved or scraped off during rotation of the valve body.

2. The shut-off valve as set forth in claim 1 wherein the actuating means further includes means for axially shifting the rotatable cylindrical valve body from a partially open position to a fully open position.

3. The shut-off valve as set forth in claim 2 wherein a portion of the rotatable cylindrical valve body is mounted within the cylindrical guide channel in all positions of the rotatable cylindrical valve body.

4. The shut-off valve as set forth in claim 1 wherein one end of the elliptical opening is in line with a portion of the housing passage and the other end of the elliptical opening extends outside of the housing passage.

* * * * *